(12) United States Patent
Orlando

(10) Patent No.: US 6,250,061 B1
(45) Date of Patent: Jun. 26, 2001

(54) COMPRESSOR SYSTEM AND METHODS FOR REDUCING COOLING AIRFLOW

(75) Inventor: Robert J. Orlando, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/260,296

(22) Filed: Mar. 2, 1999

(51) Int. Cl.[7] .................................................. F02C 13/10
(52) U.S. Cl. ............................................. 60/39.02
(58) Field of Search .............................. 60/39.02, 39.07, 60/39.75, 728

(56) References Cited

U.S. PATENT DOCUMENTS 5,163,285 * 11/1992 Mazeaud et al. .

* cited by examiner

Primary Examiner—Timothy S. Thorpe
Assistant Examiner—William H. Rodriguez
(74) Attorney, Agent, or Firm—Andrew C. Hess; William S. Andes

(57) ABSTRACT

A cooling airflow compressor system and methods for reducing a cooling airflow is described. The cooling airflow compressor system utilizes a primary high pressure compressor in combination with a secondary high pressure compressor to further compress a primary airflow. The secondary high pressure compressor includes a rotor driven by a high pressure turbine connected by a high pressure turbine shaft to the primary high pressure compressor. A heat exchanger is connected to the secondary high pressure compressor to further cool the cooling airflow. The cooling airflow is utilized to cool the turbine and a high pressure turbine vane.

20 Claims, 4 Drawing Sheets

COMPRESSOR SYSTEM AND METHODS FOR REDUCING COOLING AIRFLOW

BACKGROUND OF THE INVENTION

This invention relates generally to turbine engines and, more particularly, to a system and methods for improved cooling in turbine engines.

Gas turbine engines tipically include a core engine having, in serial flow relationship, a multistage axial flow low pressure compressor and a multistage axial flow high pressure compressor which supplies high pressure airflow to a combustor. The compressors include stages of stationary components referred to as stators and stages of rotational components, which add work and compress the airflow entering the core engine system, referred to as rotors.

A portion of the high pressure compressed airflow supplied to the combustor is mixed with fuel, ignited, and utilized to generate hot propulsive combustion gases which flow further downstream to one of the multistage flow paths. Particularly, the combustion gases flow through one or more turbine stages which extract energy from the hot propulsive combustion gases to power the rotors in the compressors and provide other useful work. For example, a high pressure turbine may be rotated by the hot propulsive combustion gases and may be connected to the high pressure compressor by a shaft so that the high pressure turbine drives the rotors in the high pressure compressor.

A typical bypass turbine engine adds a low pressure turbine, aft of the high pressure turbine, to drive the low pressure compressor and a front fan. The front fan is located forward of, and drives, the airflow into the low pressure compressor. The airflow that does not enter the core engine through the low pressure compressor is directed through a fan bypass duct by a flow splitter. The bypass airflow from the fan exists the fan bypass duct to provide most of the engine thrust. The rest of the engine thrust comes from the core engine airflow after it leaves the turbine stages and is accelerated out of the exhaust nozzle.

Turbine engines are constructed to operate at high temperatures to maximize engine thrust. Cooling of engine components, such as components of the high pressure turbine, is necessary due to thermal stress limitations of materials used in construction of such components. Typically, cooler airflow is extracted from an outlet of the compressors and the cooler airflow is used to cool, for example, turbine airfoils.

For example, a portion of the low pressure compressed airflow may be extracted from the low pressure compressor for turbine section cooling, airframe pressurization, anti-icing, and other uses. Increasing the pressure of the airflow in the compressors increases the relative temperature of the airflow as well and makes it desirable to extract the airflow from the compressors after the minimum number of stages. Unfortunately, the relatively low pressure and hot temperature of the airflow limits the effective use of the compressed airflow to cool such engine components.

Accordingly, it would be desirable to provide cooler airflow to high temperature turbine engine components. Additionally, it would be desirable to increase the pressure of the cooler airflow to cool more components and reduce the amount of cooling air utilized.

BRIEF SUMMARY OF THE INVENTION

These and other objects may be attained by a cooling airflow compressor system utilizing an existing turbine to drive a primary high pressure compressor and a secondary high pressure compressor.

More particularly, and in an exemplary embodiment, the cooling airflow compressor system diverts a portion of a primary airflow from a first passageway, formed in the primary high pressure compressor, into a second passageway, formed in the secondary high pressure compressor to generate a cooling airflow. The cooling airflow is further compressed by a rotor positioned within the second passageway. The rotor is driven by the existing high pressure turbine.

A heat exchanger is connected to the second passageway for cooling the cooling airflow. The primary high pressure compressor directs compressed air to a combustor. The second passageway directs the cooling airflow from the secondary high pressure compressor around the combustor and through a high pressure turbine vane stage and a high pressure turbine blade downstream of the combustor. The cooling airflow is then utilized to cool the high pressure turbine vane and blade stages, and for film cooling.

The increased cooling pressure of the cooling airflow allows for a greater latitude in the construction of cooling circuits, an efficient use of the cooling airflow, and an increase in the number of engine components that can be cooled with the cooling airflow. In addition, the cooling airflow compressor system results in an overall efficiency improvement and a minimization of additional parts.

DETAILED DESCRIPTION OF THE INVENTION

Figure 1:
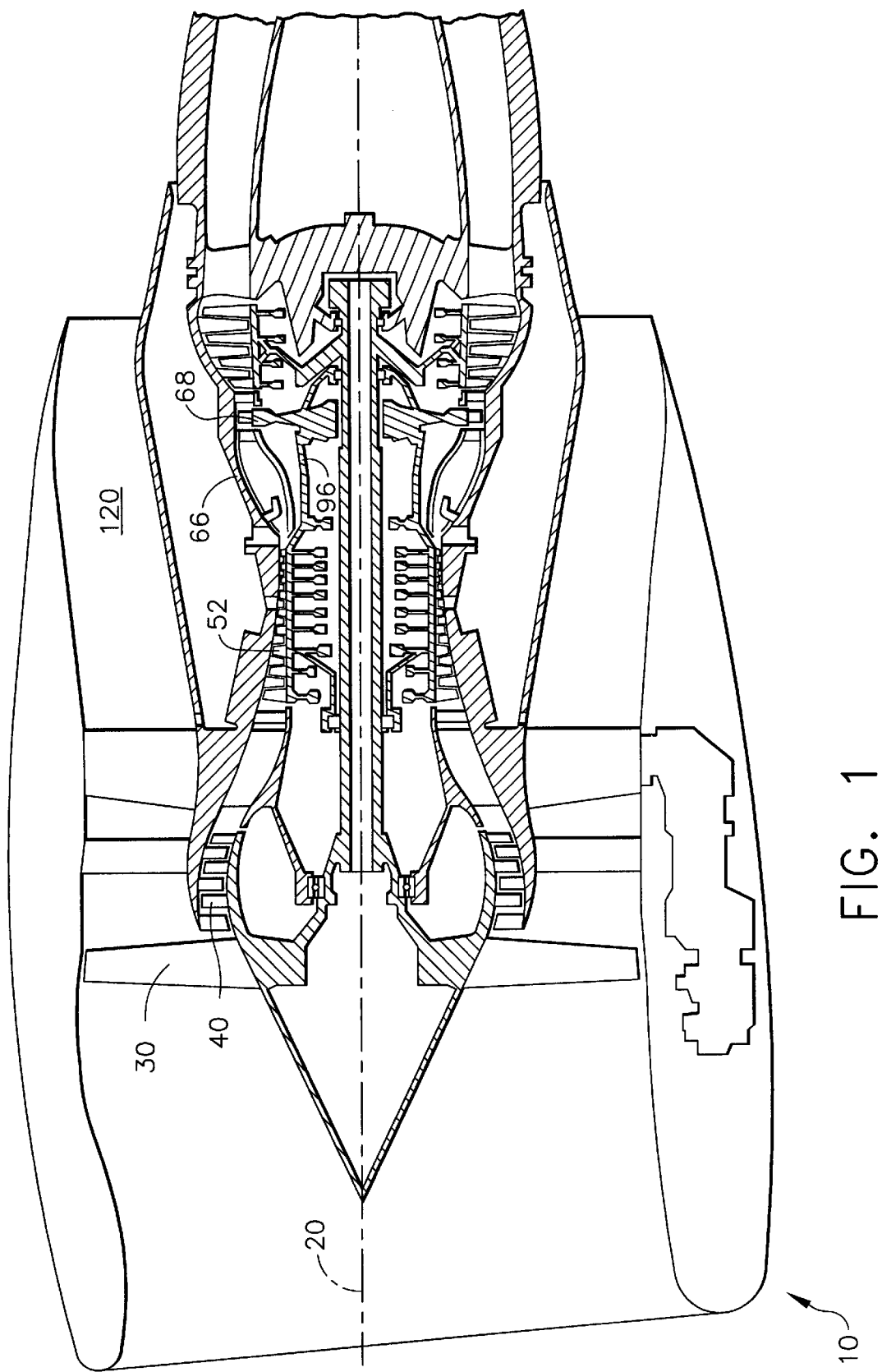
FIG. 1 is a cross sectional view of a turbine engine including a front fan, a low pressure compressor, and a high pressure compressor.

FIG. 1 is a cross sectional view of a turbine engine 10 symmetrical about a central axis 20. Engine 10 includes, in serial flow communication, a front fan 30, a multistage low pressure compressor 40 and a multistage primary high pressure compressor 52. Primary high pressure compressor 52 is in flow communication with a combustor 66 and a high pressure turbine 68. A fan bypass duct 120 surrounds compressors 40 and 52.

During operation of engine 10, an airflow may move downstream through fan 30 and into multistage low pressure compressor 40 or out through bypass duct 120. The airflow that is compressed continues to flow downstream through primary high pressure compressor 52 where the air becomes highly pressurized. At least a portion of the highly pressurized air is directed to combustor 66, mixed with fuel, and ignited to generate hot combustion gases which flow further downstream and are utilized to power front fan 30, low pressure compressor 40, and primary high pressure compressor 52.

Figure 2:
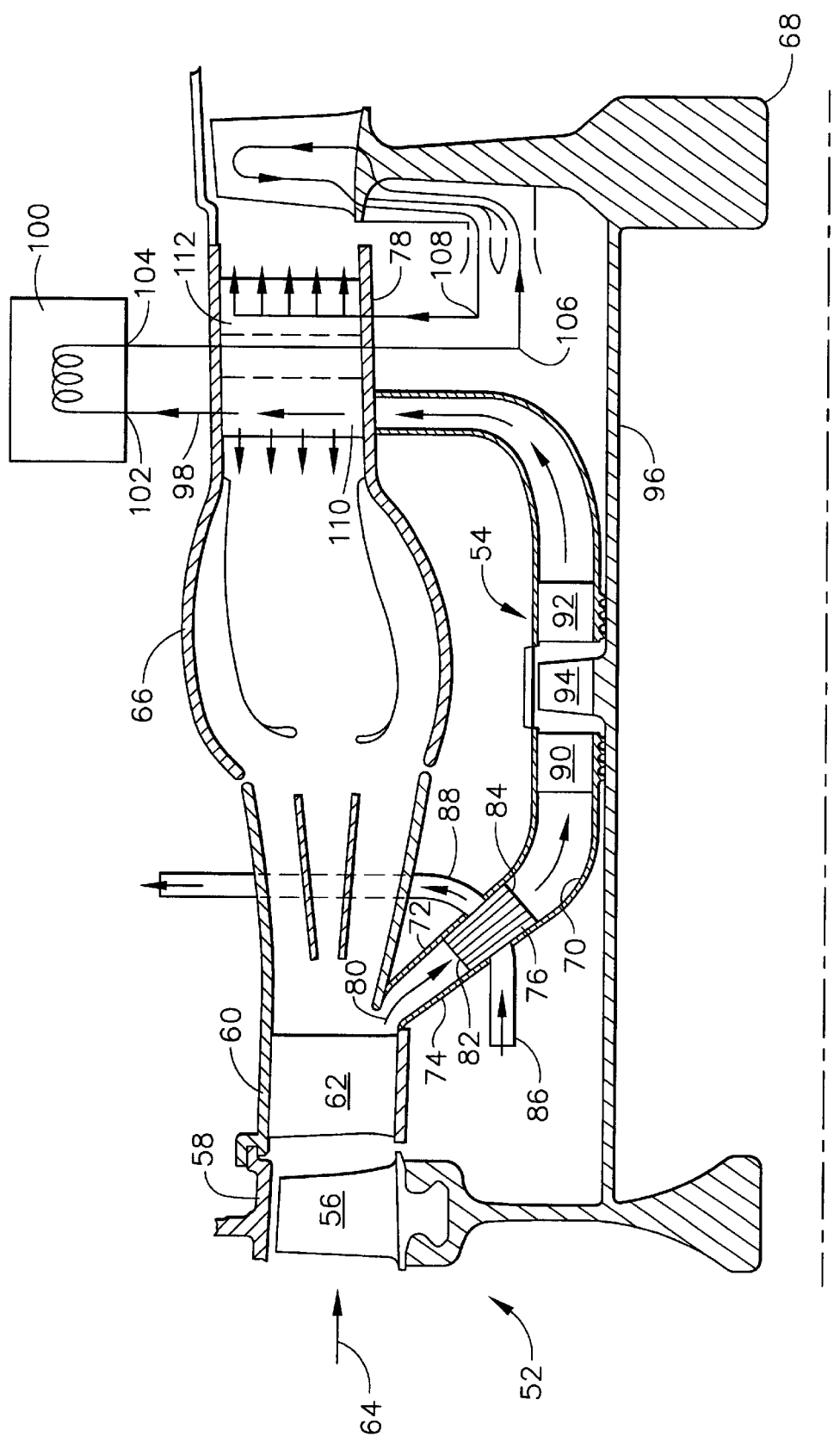
FIG. 2 is a schematic view of the high pressure compressor shown in FIG. 1 including a cooling airflow compressor system.

FIG. 2 illustrates a cooling airflow compressor system 50 for a turbine engine (shown in FIG. 1). Cooling airflow compressor system 50 includes primary high pressure compressor 52 in flow communication with a secondary high pressure compressor 54. Primary high pressure compressor 52 includes a plurality of rotors 56 surrounded by a plurality of rotor shrouds 58 connected to a stator casing 60. Stator casing 60 surrounds a plurality of stators 62. A first flow path, or passageway, 64 is formed by rotors 56, rotor shrouds 58, stator casing 60, and stators 62. First passageway 64 extends through primary high pressure compressor 52, combustor 66, and high pressure turbine 68.

A second flow path, or passageway, 70 connects to, and is in flow communication with first passageway 64 and diverts a portion of the primary airflow from primary high pressure compressor 52 to high pressure turbine 68 without passing through combustor 66. Second passageway 70 is formed by a first segment 72 and a second segment 74 and extends through a first heat exchanger 76, secondary high pressure compressor 54, and a high pressure turbine vane 78. Second passageway 70 bypasses combustor 66 and is in flow communication with first passageway 64 at a point 80 and at high pressure turbine vane 78.

First heat exchanger 76 is in flow communication with primary high pressure compressor 52 and secondary high pressure compressor 54. First heat exchanger 76 includes a first inlet 82, a first outlet 84, a second inlet 86, and a second outlet 88. First heat exchanger first inlet 82 is in flow communication with primary high pressure compressor 52 and first heat exchanger first outlet 84 is in flow communication with secondary high pressure compressor 54. First heat exchanger second inlet 86 and second outlet 88 are in flow communication with a cooling flow, described more fully below. First heat exchanger first inlet 82 and first outlet 84 are connected to second passageway 70 by first segment 72 and second segment 74.

Second passageway 70 includes a first stator 90 and a second stator 92 connected to first segment 72 and second segment 74. A rotor 94 is connected by a high pressure shaft 96 to high pressure turbine 68 and rotors 56. Rotor 94, first stator 90, and second stator 92 are in flow communication with second passageway 70.

Second passageway 70 connects to, and is in flow communication with high pressure turbine vane 78. A first pipe 98 is connected to, and in flow communication with, high pressure turbine vane 78 and a second heat exchanger 100. Second heat exchanger 100 includes a first inlet 102, a first outlet 104, a second inlet (not shown), and a second outlet (not shown).

Second heat exchanger first outlet 104 connects to, and is in flow communication with, high pressure turbine vane 78. The second inlet and the second outlet of second heat exchanger 100 are also in flow communication with the cooling flow more fully described below. A second pipe 106 connects to, and is in flow communication with, high pressure turbine vane 78 and turbine 68.

Turbine 68 is connected to, and is in flow communication with, a third pipe 108. Third pipe 108 connects to, and is in flow communication with, high pressure turbine vane 78. Turbine 68 includes a cooling cavity (not shown), and high pressure turbine vane 78 includes a forward section 110 and an aft section 112. In one embodiment, cooling airflow compressor system 50 includes only first heat exchanger 76. Additionally, second passageway 70 may utilize any number of stators 90 and 92 and rotors 94.

During operation of the turbine engine, a portion of a primary airflow is diverted from first passageway 64 by second passageway 70 and is utilized as a cooling airflow to cool engine components downstream of combustor 66. The cooling airflow is cooled and compressed in second passageway 70 by first heat exchanger 76 and secondary high pressure compressor 54. First heat exchanger 76 and second heat exchanger 100 direct the cooling airflow into contact with the cooling flow to cool the cooling airflow. The cooling flow may be front fan airflow directed from fan bypass duct 120 (shown in FIG. 1), discharge from low pressure compressor 40 (shown in FIG. 1), or engine fuel flow (shown in FIG. 4).

First heat exchanger 76 operates by bringing the cooling flow through tubes or pipes (not shown). The cooling airflow is then directed over or around the tubes or pipes carrying the cooling flow. A heat exchange occurs between the cooling flow and the cooling airflow, with heat or energy moving from the cooling airflow to the cooling flow. The cooling airflow is then cooled while the cooling flow is heated. When the cooling flow is engine fuel, it becomes heated and is quicker to expand and produce energy when directed into combustor 66.

Figure 3:
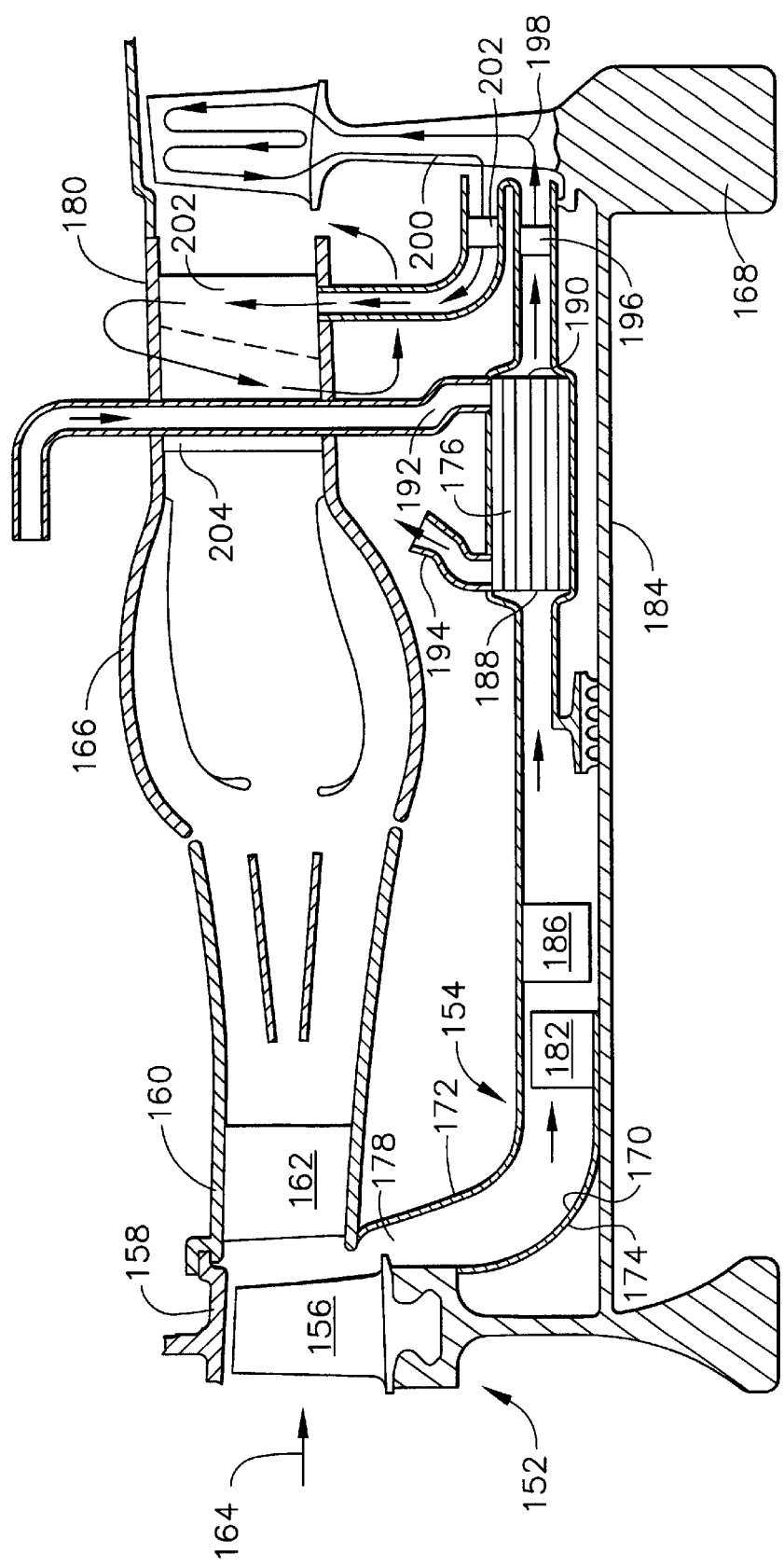
FIG. 3 is a schematic view of an alternative embodiment of the cooling airflow compressor system shown in FIG. 2.

FIG. 3 illustrates a cooling airflow compressor system 150 for a turbine engine (shown in FIG. 1). Cooling airflow compressor system 150 includes a primary high pressure compressor 152 in flow communication with a secondary high pressure compressor 154. As shown in FIG. 3, primary high pressure compressor 152 includes a plurality of rotors 156 surrounded by a plurality of rotor shrouds 158 connected to a stator casing 160. Stator casing 160 surrounds a plurality of stators 162.

A first flow path, or passageway, 164 is formed by rotors 156, rotor shrouds 158, stator casing 160, and stators 162. First passageway 164 extends through primary high pressure compressor 152, combustor 166, and a high pressure turbine 168. Combustor 166 and high pressure turbine 168 are directly analogous to combustor 66 and high pressure turbine 68 (shown in FIGS. 1 and 2).

A second flow path, or passageway, 170 connects to, and is in flow communication with first passageway 164 and diverts a portion of the primary airflow from primary high pressure compressor 152 to high pressure turbine 168 without passing through combustor 166. Second passageway 170 is bordered by a first segment 172 and a second segment 174 and extends through secondary high pressure compressor 154, a heat exchanger 176, and turbine 168. Second passageway 170 bypasses combustor 166 and is in flow communication with first passageway 164 at a point 178 and at a high pressure turbine vane 180.

A rotor 182 is connected by a high pressure shaft 184 to high pressure turbine 168 and rotors 156. Second passageway 170 includes a first stator 186 connected to first segment 172 and second segment 174. Rotor 182 and stator 186 are in flow communication with second passageway 170.

Second passageway 170 connects to, and is in flow communication with, heat exchanger 176 which includes a first inlet 188 and a first outlet 190. Heat exchanger 176 also includes a second inlet 192 and a second outlet 194 in flow communication with a cooling flow, described in detail in the operation of FIG. 2. A second stator 196 is in flow communication with first outlet 190 and a first pipe 198 which connects to, and is in flow communication with, high pressure turbine 168.

Turbine 168 is connected to, and is in flow communication with, a second pipe 200. Second pipe 200 includes a third stator 202. Second pipe 200 is connected to, and is in flow communication with, high pressure vane 180. Turbine 168 includes a cooling cavity (not shown), and high pressure vane 180 includes a forward section 204 and an aft section 206. Additionally, second passageway 170 and cooling airflow compressor system 150 may utilize any number and configuration of stators 186, 196, and 202, rotors 182, and heat exchangers 176.

During operation of the turbine engine, a portion of a primary airflow is diverted from primary high pressure compressor 152 to secondary high pressure compressor 154 and is utilized as a cooling airflow to cool engine components downstream of combustor 166. The cooling airflow is further compressed by secondary high pressure compressor 154 and cooled by heat exchanger 176.

Heat exchanger 176 directs the cooling airflow into contact with the cooling flow and cools the cooling airflow as discussed in detail in the operation of FIG. 2. The cooling flow may be front fan airflow directed from fan bypass duct 120 (shown in FIG. 1), discharge from low pressure compressor 40 (shown in FIG. 1), or engine fuel flow (shown in FIG. 4). Alternatively, secondary high pressure compressor 154 may be a secondary low pressure compressor driven by a low pressure turbine, or some combination of turbine 168 and the low pressure turbine.

Figure 4:
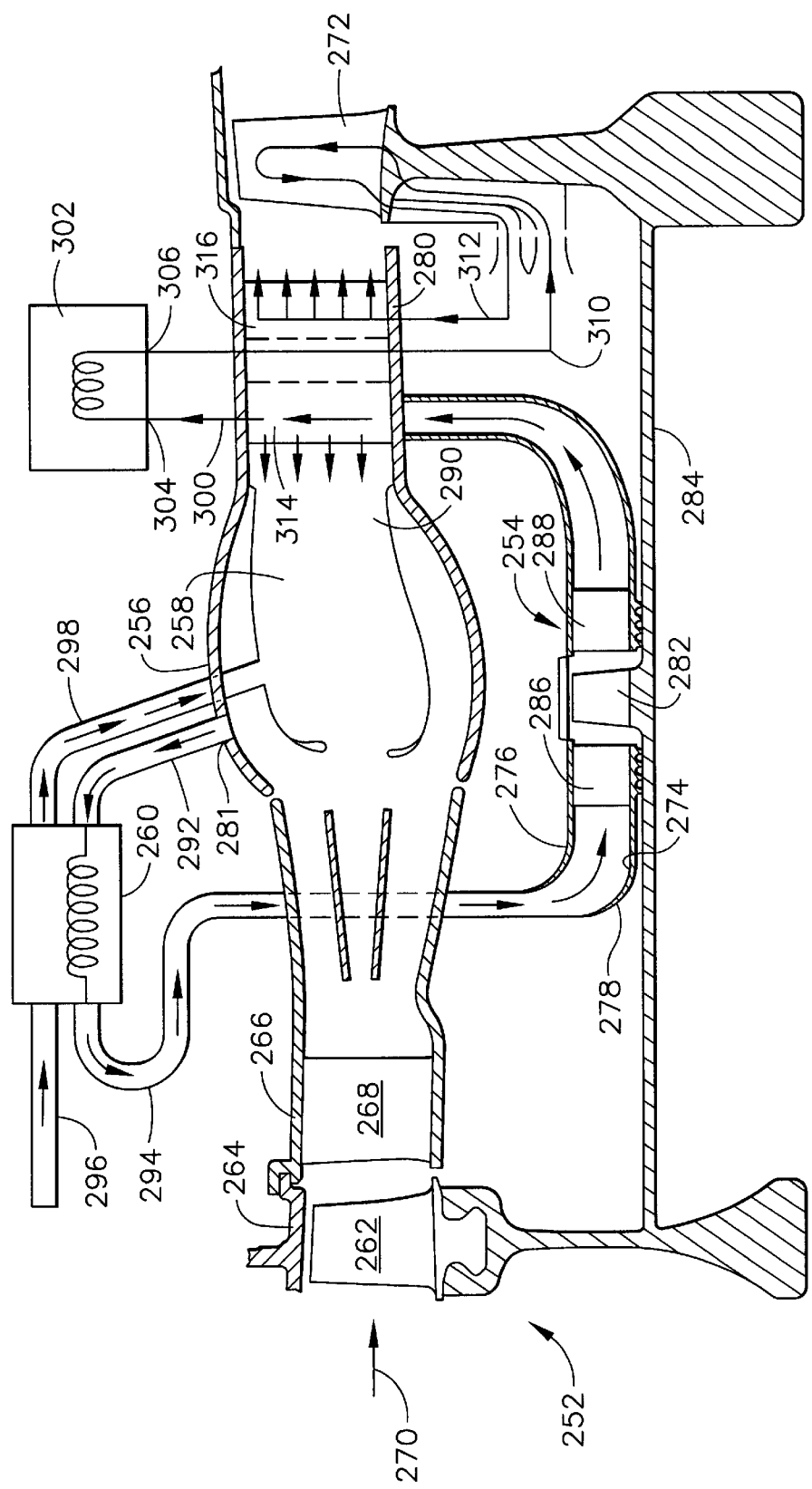
FIG. 4 is a schematic view of a further embodiment of the cooling airflow compressor system shown in FIG. 3.

FIG. 4 illustrates a cooling airflow compressor system 250 for a turbine engine (shown in FIG. 1). Cooling airflow compressor system 250 includes a primary high pressure compressor 252 in flow communication with a secondary high pressure compressor 254 through a combusor casing 256 of a combustor 258 and a first heat exchanger 260. As shown in FIG. 4, primary high pressure compressor 252 includes a plurality of rotors 262 surrounded by a plurality of rotor shrouds 264 connected to a stator casing 266. Stator casing 266 surrounds a plurality of stators 268.

A first flow path, or passageway, 270 is formed by rotors 262, rotor shrouds 264, stator casing 266, and stators 268. First passageway 270 extends through primary high pressure compressor 252, combustor 258, and a high pressure turbine 272. Combustor 258 and high pressure turbine 272 are directly analogous to combustor 66 and high pressure turbine 68 (shown in FIGS. 1, 2, and 3).

A second flow path, or passageway. 274 connects to combustor casing 256, is in flow communication with first passageway 270, and diverts a portion of the primary airflow from primary high pressure compressor 252 to high pressure turbine 272 without passing through combustor 258. Second passageway 274 is bordered by a first segment 276 and a second segment 278 and extends through secondary high pressure compressor 254 and a high pressure turbine vane 280. Second passageway 274 bypasses combustor 258 and is in flow communication with first passageway 270 at a point 282 and at high pressure turbine vane 280.

A rotor 282 is connected by a high pressure shaft 284 to high pressure turbine 272 and rotors 262. Second passageway 274 includes a first stator 286 and a second stator 288 connected to first segment 276 and second segment 278. Rotor 282, first stator 286, and second stator 288 are in flow communication with second passageway 274.

Combustor 258 includes an internal combustion cavity 290 surrounded by combustor casing 256. Combustor casing 256 connects to, and is in flow communication with, first heat exchanger 260. First heat exchanger 260 includes a first inlet 292, a first outlet 294, a second inlet 296, and a second outlet 298.

Second passageway 274 connects to, and is in flow communication with high pressure turbine vane 280. A first pipe 300 is connected to, and in flow communication with, high pressure turbine vane 280 and a second heat exchanger 302. Second heat exchanger 302 includes a first inlet 304, a first outlet 306, a second inlet (not shown), and a second outlet (not shown).

Second heat exchanger first outlet 306 connects to, and is in flow communication with, high pressure turbine vane 280. The second inlet and the second outlet of second heat exchanger 302 are also in flow communication with the cooling flow more fully described below. A second pipe 310 connects to, and is in flow communication with, high pressure turbine vane 280 and turbine 272.

Turbine 272 is connected to, and is in flow communication with, a third pipe 312. Third pipe 312 connects to, and is in flow communication with, high pressure turbine vane 280. Turbine 272 includes a cooling cavity (not shown), and high pressure turbine vane 280 includes a forward section 314 and an aft section 316. In one embodiment, cooling airflow compressor system 250 includes only first heat exchanger 260. Additionally, second passageway 274 may utilize any number of stators 286 and 288 and rotors 282.

During operation of the turbine engine, a portion of a primary airflow is diverted from primary high pressure compressor 252 and the airflow which circulates through combustor casing 256 to secondary high pressure compressor 254 and is utilized as a cooling airflow to cool engine components downstream of combustor 258. The cooling airflow is further compressed by secondary high pressure compressor 254 and cooled by first heat exchanger 260 and second heat exchanger 302. Airflow circulates through combustor casing 256 and is utilized to cool combustor 258 and stator casing 266 surrounding combustor 258.

First heat exchanger 260 directs the cooling airflow into contact with engine fuel flow and cools the cooling airflow while heating and expanding the engine fuel. The cooling airflow is directed over or around the tubes or pipes (not shown) carrying the engine fuel to the combustor 258. A heat exchange occurs between the engine fuel and the cooling airflow with heat or energy moving from the cooling airflow to the engine fuel. The cooling airflow is then cooled while the engine fuel is heated.

Second heat exchanger 302 directs the cooling airflow into contact with the cooling flow. The cooling flow utilized in second heat exchanger 302 may be front fan airflow directed from fan bypass duct 120 (shown in FIG. 1), or discharge from low pressure compressor 40 (shown in FIG. 1). Second heat exchanger 302 operates like first heat exchanger 260 by bringing the cooling flow through tubes or pipes. In one embodiment, cooling airflow compressor system 250 includes only first heat exchanger 260 and secondary high pressure compressor 254 may be a secondary low pressure compressor driven by a low pressure turbine, or some other combination of turbines or engine components.

Secondary high pressure compressor 254 is driven by turbine 272 which results in overall system efficiency improvement and minimizes the additional parts necessary to further compress the primary airflow. First heat exchanger 260 and second heat exchanger 302 decreases the temperature of the primary airflow resulting in cooling airflow that is cooler and at a higher pressure than the exit pressure of primary high pressure compressor 252. Cooling airflow compressor system 250 is described as an exemplary embodiment and may be altered to meet desired performance characteristics. In addition, cooling airflow compressor system 250 may be positioned in other locations. The cooling airflow may then be increasingly and repeatedly utilized to cool engine components downstream of combustor 258, for example the low pressure turbine stages.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A cooling airflow compressor system for a turbine engine, said system comprising:

a high pressure turbine;

a first compressor comprising a stator casing, a plurality of rotor shrouds, and a plurality of stators and rotors connected to said turbine, said first compressor configured to be in flow communication with a combustor;

a second compressor connected to, and in flow communication with, a high pressure turbine vane and said first compressor, said second compressor further connected to and in flow communication with said turbine, said second compressor configured to divert a portion of a primary airflow from said first compressor; and at least two heat exchangers in flow communication with said second compressor and said turbine, said heat exchangers configured to cool said diverted primary airflow from said first compressor, each said heat exchanger comprises a first inlet and a first outlet and a second inlet and a second outlet, each said first inlet in flow communication with said second compressor, each said first outlet in flow communication with said high pressure turbine vane.

2. A cooling airflow compressor system in accordance with claim 1 wherein said first compressor further comprises a first flow path defined by said stator casing and said rotor shroud, said first flow path further defined by said plurality of stators and rotors, said first flow path in flow communication with the combustor.

3. A cooling airflow compressor system in accordance with claim 2 wherein said second compressor comprises a first segment and a second segment extending from said first flow path of said first compressor, said first segment and said second segment defining a second flow path, said second flow path configured to bypass the combustor.

4. A cooling airflow compressor system in accordance with claim 3 wherein said second compressor further comprises at least one rotor and at least one stator in flow communication with said second flow path, said rotor connected to said turbine, said stator connected to said first segment and said second segment.

5. A cooling airflow compressor system in accordance with claim 4 wherein said heat exchanger comprises a first inlet and a first outlet and a second inlet and a second outlet, said first inlet in flow communication with said first compressor, said first outlet in flow communication with said second compressor, and said second inlet and said second outlet in flow communication with a cooling flow.

6. A cooling airflow compressor system in accordance with claim 4 wherein said heat exchanger comprises a first inlet and a first outlet and a second inlet and a second outlet, said first inlet in flow communication with said second compressor, said first outlet in flow communication with said high pressure turbine vane, and said second inlet and said second outlet in flow communication with a front fan airflow.

7. A cooling airflow compressor system in accordance with claim 4 wherein each said heat exchanger second inlet and each said heat exchanger second outlet in flow communication with an engine fuel flow.

8. A turbine engine comprising:

a turbine;

a combustor;

a first compressor connected to said turbine, said first compressor comprising a first passageway extending therethrough, said first passageway comprising a plurality of stators and rotors, said stators and rotors surrounded by a stator casing and rotor shrouds, said first passageway in flow communication with said combustor;

a second compressor connected to said turbine, said second compressor in flow communication with said first compressor and said turbine, said second compressor comprising a second passageway extending therethrough, said second passageway comprising at least one stator, an inlet, and at least one rotor, said second passageway inlet located at least one of upstream from said first compressor stators adjacent said combustor and downstream from said first compressor stators adjacent said combustor, said second passageway configured to divert a portion of a primary airflow from said first passageway and bypass said combustor; and at least one heat exchanger connected downstream from and in flow communication with said second compressor.

9. A turbine engine in accordance with claim 8 wherein said second passageway further comprises a first segment and a second segment bordering said second passageway, said first segment separated from said second segment by a distance.

10. A turbine engine in accordance with claim 9 wherein said second passageway stator is connected to said first segment and said second segment, said stator in flow communication with said second passageway.

11. A turbine engine in accordance with claim 9 wherein said second passageway rotor is connected to said turbine, said rotor in flow communication with said second passageway.

12. A turbine engine in accordance with claim 11 wherein said second passageway is in flow communication with a high pressure turbine vane and said turbine.

13. A turbine engine in accordance with claim 12 wherein said second passageway is in flow communication with said first passageway.

14. A turbine engine in accordance with claim 13 wherein said heat exchanger is in flow communication with said first passageway and said second passageway, said heat exchanger in flow communication with a cooling flow.

15. A turbine engine in accordance with claim 14 wherein said heat exchanger comprises a first inlet in flow communication with said second compressor, a first outlet in flow communication with said high pressure turbine vane, said heat exchanger further comprises a second inlet and a second outlet in flow communication with said cooling flow.

16. A turbine engine in accordance with claim 14 wherein said heat exchanger comprises a first inlet in flow communication with said first compressor, a first outlet in flow communication with said second compressor, said heat exchanger further comprises a second inlet and a second outlet in flow communication with said cooling flow.

17. A method for reducing a cooling airflow utilized in a turbine engine including a first compressor in flow communication with a combustor, the first compressor connected to, and in flow communication with, a second compressor, the second compressor including at least one stator and at least one rotor, the second compressor in flow communication with a high pressure turbine vane and a high pressure turbine, the high pressure turbine connected to the first compressor and the second compressor, and at least two heat exchangers connected to the second compressor, said method comprising the steps of:

diverting a portion of a primary airflow from the first compressor through a passageway to the second compressor to generate a cooling airflow, wherein the passageway is in flow communication with the heat exchangers, and wherein at least one of the heat exchangers is downstream from the second compressor; and increasing the pressure of the cooling airflow in the second compressor with the high pressure turbine.

18. A method for reducing cooling airflow in accordance with claim 17 wherein said step of increasing the pressure comprises the steps of:

cooling the cooling airflow in the heat exchangers; and compressing the cooling airflow in the second compressor.

19. A method for reducing cooling airflow in accordance with claim 18 wherein said step of cooling the cooling airflow comprises the steps of:

diverting the cooling airflow to the heat exchangers;

directing a cooling flow to the heat exchangers, and directing the cooling airflow into contact with the cooling flow in the heat exchangers.

20. A method for reducing cooling airflow in accordance with claim 18 wherein said step of compressing the cooling airflow comprises the steps of:

operating the rotor in the second compressor with the high pressure turbine; and directing the cooling airflow through the stator and rotor in the second compressor.

* * * * *